United States Patent [19]

Leber et al.

[11] Patent Number: 5,743,142

[45] Date of Patent: Apr. 28, 1998

[54] MULTI-RATIO POWER-SHIFTABLE REVERSING GEAR

[75] Inventors: Fritz Leber; Wolfgang Rebholz, both of Friedrichshafen, Germany

[73] Assignee: ZF Friedrichshafen AG, Friedrichshafen, Germany

[21] Appl. No.: 737,263

[22] PCT Filed: May 9, 1995

[86] PCT No.: PCT/EP95/01748

§ 371 Date: Nov. 12, 1996

§ 102(e) Date: Nov. 12, 1996

[87] PCT Pub. No.: WO95/31655

PCT Pub. Date: Nov. 23, 1995

[30] Foreign Application Priority Data

May 13, 1994 [DE] Germany ............... 44 16 929.9

[51] Int. Cl.⁶ .................................................. F16H 3/093
[52] U.S. Cl. ............................. 74/331; 74/325; 74/333
[58] Field of Search ........................ 74/325, 331, 333, 74/337

[56] References Cited

U.S. PATENT DOCUMENTS

| | | | |
|---|---|---|---|
| 4,392,391 | 7/1983 | Jameson et al. | 74/333 |
| 4,549,443 | 10/1985 | White | 74/333 X |
| 4,726,246 | 2/1988 | Whalen | 74/333 X |
| 5,063,793 | 11/1991 | McAskill | 74/331 X |
| 5,079,965 | 1/1992 | Leber et al. | 74/331 |
| 5,249,475 | 10/1993 | McAskill | 74/331 |
| 5,471,892 | 12/1995 | Sherman | 74/325 |
| 5,557,978 | 9/1996 | McAskill | 74/331 |
| 5,592,853 | 1/1997 | Rebholz et al. | 74/325 |

FOREIGN PATENT DOCUMENTS

| | | |
|---|---|---|
| 11 29 838 | 5/1962 | Germany . |
| 25 35 700 | 2/1977 | Germany . |
| 42 42 942 | 6/1994 | Germany . |

*Primary Examiner*—Khoi Q. Ta
*Assistant Examiner*—Peter T. Kwon
*Attorney, Agent, or Firm*—Davis and Bujold

[57] ABSTRACT

The invention relates to a powershiftable multi-ratio reversing gear, especially for use in building machines. The clutches (17, 18, 23 and 26) are fitted between a fixed and a loose pinion. The loose pinions, which can rotate at relatively high speeds, are connected to the inner plates of a set of plates (39). The outer plates are fitted in the clutch housing of each of the clutches. This provides advantages for hydraulic operation of the clutches.

10 Claims, 2 Drawing Sheets

5,743,142

MULTI-RATIO POWER-SHIFTABLE REVERSING GEAR

The invention concerns a multi-ratio powershiftable reversing gear having an input shaft and countershafts, a reversing set, clutches situated upon the countershafts with loose pinions which optionally can be non-rotatably connected with one of the countershafts for changing gear and direction and one output gear set with a fixed pinion upon an output shaft.

BACKGROUND OF THE INVENTION

In building machines used at present, gears are used which can essentially be divided in two groups. Characteristic of one group is that on the powershift gear is a front mounted hydrostatic driving unit. In this gear the speed and torque of the splitter group are adapted by hydraulic or electrohydraulic control.

The predominant number of gears used belongs to the other group of the powershift gear with front-mounted, hydrodynamic torque converters. By means of said driving unit, it is possible to obtain a continuous and automatic torque multiplication with increasing working resistance of the motor vehicle, such as a building machine. Here gear input torques can be produced which substantially correspond to a triple value of the engine torque. This is significant, since differently from what is the case in the passenger car, the work is done with the gear or converter. In a loader, the shovel is pushed into absorbing ground, for example. The filling is broken up and lifted. For loading, the vehicle is reversed, the shovel is further lifted and unloaded. The torque conversion is a great advantage precisely at low speeds and great speed differences between the input and output.

The converter can be complemented by a converter bridge clutch. By means of said clutch it is possible to obtain a considerable reduction of consumption within the gears in the range of higher speeds.

The power flow in the individual gears is produced by a combination of hydraulically shiftable clutches. Among other things, said clutches must be powershiftable for reversing and, therefore, absorb much energy. The design of the housing or arrangement of the shafts of the gear must be adapted to a specific use. Typical examples of use for a reversing gear are dump carts, loaders, excavator loaders and lift trucks, and also in vehicles that must be operated on the street such as motor cranes. Depending on the type of vehicle, a specific center distance between the input and output shafts of the gear is required. Long center distances are to be maintained, for example, when the angle of inflection of universal shafts must be kept small. In this case, the reversing gear assumes an additional function as a transfer gear.

In lift trucks the reversing gear has only one output shaft. Due to the spatial conditions a smaller center distance is needed.

In most cases it is required that at least one power take off is driven in dependence on the engine speed, for example, for the hydraulic system of the mobile machine. Together with the power take off a lubricant and shift pump is also provided which likewise is driven depending on the engine speed.

Depending on the type of construction of the vehicle, the tasks to be performed by a reversing gear are very diverse.

DE-A 11 29 838 has disclosed a reversing gear which stands out by a small axial length. A fixed pinion, which is constantly meshed with fixed pinions upon a reversing shaft and a countershaft, is upon an input shaft. All loose pinions are upon one side of the gear and constantly meshed with each other. A respective friction clutch is situated between the loose and fixed pinions. In this known reversing gear, the practical construction of the friction clutches, particularly the arrangement of the sets of plates, the mounting of the loose pinions upon the countershafts and also the indirect support of the countershaft on the side of the loose pinions, turns out to be relatively expensive.

DE-A 25 35 700 has disclosed a reversing gear in which the friction clutches are designed as double clutches. In this gear it is possible to obtain a relatively high number of gears, but a large installation space is needed, in an axial direction, since up to four gears and one double clutch are to be lodged on one countershaft.

SUMMARY OF THE INVENTION

This invention is based on the problem of improving a powershiftable reversing gear with a small axial length regarding the design of the friction clutches and the support of the countershafts.

The problem on which the invention is based is solved by the fact that the reversing set is formed by a fixed pinion of the input shaft and loose pinions supported on the countershafts, that fixed pinions of the countershaft and one loose pinion situated on the output shaft form a drive wheel chain, and that the output gear set is formed by one fixed pinion of the output shaft and one loose pinion supported on the countershaft. The proposed reversing gear stands out by a series of advantages. The loose pinions are arranged so as not to rotate under a load with a relative speed in relation to their countershafts. Said loose pinions also are not used as intermediate gears so that they are not loaded with a great load from two meshing parts. Therefore, the roller bearings, of which at least one is situated below a set of plates of a clutch, can be sized small. The loose pinions rotate only when under load and, while the clutch is engaged, the relative speed between said loose pinion and the countershaft thereof is equal to zero. If an intermediate gear is needed, it is formed by one fixed pinion. The gear distinguishes itself by a compact design. A total of four roller bearings, of which two are of comparatively small size, are provided to support one countershaft. Thereby a reduction in cost is to be noted, together with a small bending of the countershaft.

It is advantageous to design the gear coordinated with the clutch for the first gear as a loose pinion. Even though said loose pinion rotates at a relatively high speed, it nevertheless allows an advantageous coordination with the clutch. It meshes with a fixed pinion upon the countershaft. Said fixed pinion is also helically cut. A large supporting base is available for its support so that the rocking forces that appear are easily absorbed.

The gear, which can be non-rotatably connected by a clutch with the output shaft for the first gear, is also designed as a loose pinion. The above explained advantages also fundamentally apply here.

A preferred arrangement of the clutches results if the inner plates of the set of plates are connected with the loose pinions while the outer plates of the set of plates are accommodated in clutch housings which are part of the countershafts. The gears which rotate at relatively high speeds are thus designed as loose pinions. They are not non-rotatably connected with the piston chamber of the hydraulic operation and with the outer plates carrier. A high gearshift quality can be obtained with said arrangement. The danger of plate wobble occurring is small. To obtain as large as possible a support base, for supporting the loose pinions in a compact design, it is of special advantage if each loose pinion is supported upon its countershaft by two roller bearings. One roller bearing is situated below and substantially central relative to a set of plates while the other roller bearing lies substantially on the vertical plane of the meshing tooth.

To prevent large accelerations of the hydraulic actuation of the clutches, each piston is movably supported in an annular space of the clutch housing. The clutch housing is non-rotatably connected with the respective countershaft. The piston is snugly passed into the annular space via seals such as O-rings.

To protect the loose pinions against heavy loads, they do not rotate under load relative to their countershafts. For loading, it is advantageous that the loose pinions not be used as intermediate gears and accordingly rotate only with one meshing tooth.

BRIEF DESCRIPTION OF THE DRAWINGS

Other features essential to the invention and the advantages resulting therefrom are to be understood from the description of an embodiment that follows. In the drawings.

DESCRIPTION OF THE PREFERRED EMBODIMENT

Figure 1:
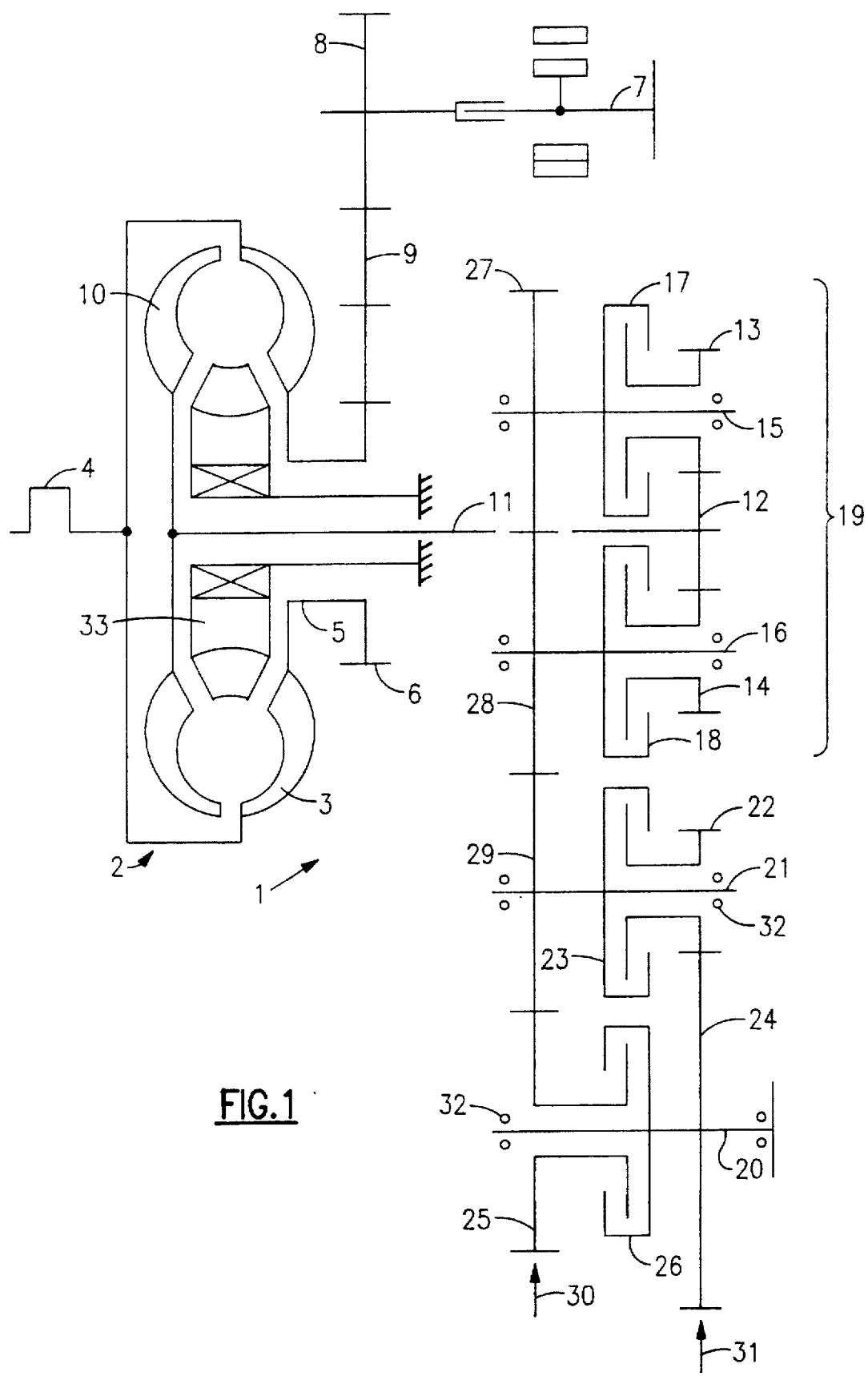
FIG. 1 is a two-ratio reversing gear shown as a transmission diagram.

In FIG. 1, a transmission diagram of a powershiftable reversing gear 1 is reproduced. It is a two-ratio reversing gear the front of which can be mounted with a hydrodynamic torque converter 2, which will preferably be the case in heavy construction vehicles.

An impeller 3 of the hydrodynamic torque converter is in operative connection with an engine 4, diagrammatically indicated. On an output shaft 5 of the impeller 3 is non-rotatably situated a gear 6. The latter is in meshed driving connection with a gear 8 likewise non-rotatably situated upon a countershaft 7, as is indicated by the dotted connection 9. The gears 6 and 8 and the countershaft 7 form a power take-off with which can operate, depending on the engine speed, an oil pump or a stub shaft, for example.

The turbine wheel 10 of the hydrodynamic torque converter is non-rotatably connected with an input shaft 11. A fixed pinion 12 is situated on the end, appearing to the right in the drawing, of the through input shaft 11 (for reasons of clarity the input shaft 11 is shown in the drawing by broken lines). The fixed pinion 12 is in meshed driving connection with loose pinions 13 and 14. The pinions 13 and 14 are each supported on a countershaft 15 and 16.

Respective non-rotatably connectable with the countershaft 15 or the countershaft 16 is the loose pinion 13, by a clutch 17, and the loose pinion 14, by a clutch 18. A reversing set 19 is formed by the fixed pinion 12 and the loose pinions 13 and 14 optionally non-rotatably connectable with the respective countershaft 15 or 16.

The reversing set 19, combined with the clutches 17 and 18, allows a reversal of the direction of rotation of an output shaft 20 of the reversing gear. For said reason, the clutches 17 and 18 are also designated as directional clutches.

The hydrodynamic torque converter 2 is completed by a stator 33 which is supported by a freewheel.

The reversing gear of the countershaft type of construction has, together with the countershafts 15 and 16 and the output shaft 20, another countershaft 21. A loose pinion 22, which can be connected non-rotatably by a clutch 23 with the countershaft 21, is rotatably supported upon said countershaft. The clutch 23 is a gearshift clutch for the first gear.

The loose pinion 22 constantly meshes with a fixed pinion 24 of the output shaft 20 of the reversing gear 1.

Additionally, a loose pinion 25 is lastly rotatably supported on the output shaft 20, which can be non-rotatably coupled, by a clutch 26, with the output shaft 20. The clutch 26 forms the gearshift clutch for the second gear.

The arrangement is completed by fixed pinions 27, 28 and 29. The fixed pinion 27 is non-rotatably connected with the countershaft 15, the fixed pinion 28 is non-rotatably connected with the countershaft 16 and the fixed pinion 29 is non-rotatably connected with the countershaft 21.

The fixed pinion 29 is in meshed connection with the loose pinion 25. The fixed pinions 27, 28 and 29, the same as the loose pinion 25, form a driving wheel chain 30. The loose pinion 22 and the fixed pinion 24 form an output gear set 31.

When the first gear is engaged, the power flows via the countershaft 21 and the loose pinion 22 (when the clutch 23 is engaged) to the fixed pinion 24 of the output shaft 20. One of the clutches 17 and 18 is here engaged in the forward driving direction or in the reverse driving direction. The gearshift clutch for the second gear (clutch 26) is disengaged.

When the second gear is engaged, the clutch 23 is disengaged while the clutch 26 is engaged. The driving power flows via the driving wheel chain 30 to the output shaft 20.

Accordingly, two forward and two reverse gears can be engaged with the reversing gear 1. The following conditions are present:

| gear | clutch | reduction | step |
| --- | --- | --- | --- |
| 1, forward | 17 and 23 | 2,440 | 2,435 |
| 2, forward | 17 and 26 | 1,002 | |
| 1, reverse | 18 and 23 | 2,483 | 2,435 |
| 2, reverse | 18 and 26 | 1,020 | |

The above explained transmission diagram shows that upon each countershaft 15, 16, 21 and 20, a single clutch 17, 18, 23, 26, respectively, a single loose pinion 13, 14, 22 and 25, respectively, and a single fixed pinion 27, 28, 29 and 24, respectively, is situated. Due to the limited number of construction elements, a very short axial length of each one of the countershafts 15, 16, 20 and 21 results. The countershafts 15, 16, 20, and 21 are each supported by two roller bearings 32.

The clutches 17, 18, 23 and 26 are situated between the respective loose and fixed pinions in a common vertical plane. This feature also essentially contributes to short axial length of the reversing gear.

To obtain low levels of sound, the loose and fixed pinions 13, 14, 22, 25 and 27, 28 and 29 are helically cut. Gearings with large helix angles are preferably used. Because of the axially short design of the countershafts no large bending loads result.

Figure 2:
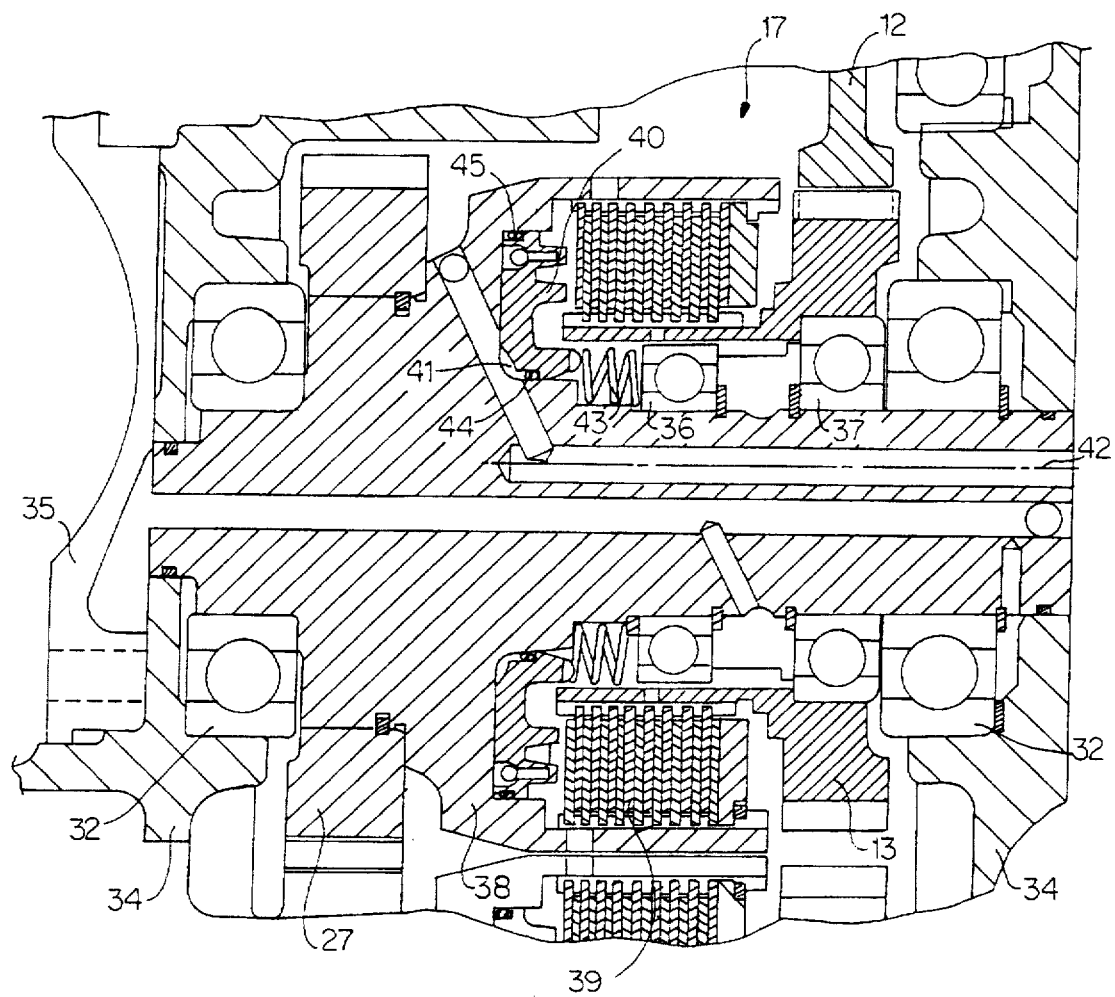
FIG. 2 is a longitudinal section through a clutch of the reversing gear according to FIG. 1.

In FIG. 2, the details of the reversing gear 1 according to FIG. 1 is shown. The clutch 17 (directional clutch forward), appearing at the top in the transmission diagram of FIG. 1, is depicted. The fixed pinion 12 of the input shaft 11 is partially shown. The countershaft 15 is supported by roller bearings 32 in a gear housing 34. In the area of the impeller 3, which is only indicated, the gear housing 34 is closed by a lid 35.

The loose pinion 13 is rotatably supported on the countershaft 15 by two roller bearings 36 and 37. Both bearings, but in particular the roller bearing 36, are of small dimensions.

The roller bearing 36 is below and centrally located in relation to a set of plates 39. The roller bearing 37 supports the loose pinion 13 in the vertical plane in which its gearing lies.

A clutch housing 38 of the clutch 17 is a component part of the countershaft 15 and a carrier of the outer plates of a set of plates 39. The inner plates of said set of plates are carried by a plate carrier of the hollow gear 13. The set of plates 39 can be actuated to a closed position, in a manner known per se, by a hydraulically operable piston 40. A duct 42, in an annular space 41 for oil feed, is used for actuation.

When the annular space 41 is pressureless, the piston 40 is converted, by springs 43, to the shown output position.

An inner and an outer O-rings 44 and 45 are used for sealing the piston 40 with respect to the clutch housing 38.

The design of the remaining clutches and the support of the remaining loose pinions correspond to the explained design.

As mentioned above, the drive wheel chain 30 is formed by the fixed pinions 27, 28, 29. The gear coordinated with the gearshift clutch for the second gear (clutch 26) is designed as loose pinion 25, which is meshed with the fixed pinion 29. The loose pinion 22 coordinated with the gearshift clutch for the first gear (clutch 23) meshes with the large fixed pinion 24 of the output shaft 20.

The loose pinions 13, 14 and 22, 25 are advantageously disposed so as not to rotate under load at a relative speed in relation to the countershafts upon which they are supported. Said loose pinions also are not used as intermediate gears so that they are additionally not loaded with the high load of two meshing parts. Therefore, it is possible to use small sized roller bearings, of which at least one is situated below the set of plates of the appertaining clutch. Said loose pinions rotate here only under load when the relative speed between one of the loose pinions and the appertaining countershaft is equal to zero. This is the case when the appertaining clutch is engaged. If an intermediate gear is needed, it is formed by a fixed pinion, as is the case, for example, with the fixed pinion 29 and the engaged second gear. The advantage of small roller bearings, for support of the loose pinions, has additional beneficial effects in the sense that the countershaft rotating under load can be supported by the roller bearings 32 in the gear housing 34. The installation space is not limited here. In summation, this means a compact design, a reduction of cost in two of the total of four bearings required for one countershaft and a small bending of the countershaft.

The drive wheel chain 30 is coupled with the turbine wheel 10 of the hydrodynamic converter 2 and, accordingly, is accelerated or decelerated together with the turbine wheel. In a reverse engagement, the acceleration of the drive wheel chain 30 with the turbine wheel is very intense. The clutch housing (for example, clutch housing 38 of the clutch 17) including the piston (for example, piston 40 of the clutch 17) are not to be affected by said acceleration for the following reasons: if the acceleration of the piston is effected by the friction of the O-rings 44 and 45, an additional spline section is spared, but the danger exists that the O-rings will wear relatively quickly because the piston rotates in the clutch housing until being accelerated or braked to the new direction of rotation or speed of the clutch housing. To avoid said disadvantages, the following arrangement is proposed:

As it can be seen from the transmission diagram of FIG. 1, the gears connected with the turbine are supported as loose pinions on the countershafts. Hereby the above explained—simple construction principle of the drag of the piston by both O-rings—can be accomplished without it being necessary to make allowance for the disadvantages described. The total mass of the strongly accelerated parts is comparatively small whereby the occurrence of large resulting forces is prevented.

The reduction step, between the first and second gear, is accomplished by the output gear set 31. The loose pinion 22 coordinated with the gearshift clutch of the first gear rotates, when the second gear is engaged (clutch 26 engaged), at a relatively high speed. The selection of said gear of the output gear set, as a loose pinion, has the advantage of not being connected with the clutch housing (clutch chamber) of the clutch 23 and thus with the carriers of the outer plates of the set of plates. Thereby said parts also are not tied up with the high speed of the loose pinion 22 when the second gear is engaged.

When the clutches are engaged, the contact pressure of the respective piston upon the set of plates is determined by the hydraulic pressure in the annular space. Said pressure is controlled with precision to obtain a slow build up of torque. The rotation pressure is superimposed over said controlled pressure, by the rotation of the pressurized oil in the annular space of the piston. To minimize said unfavorable influence on the quality of the gearshift, the speed of the clutch housing must be kept as low as possible. Added to this is that the outer plates of the set of plates are more susceptible in relation to plate wobbling than the appertaining inner plates. For this additional reason, the speed of the clutch housing (as carrier of the outer plates) must be low.

For the above reasons, the gears which are involved with the relatively high speeds are designed as loose pinions. They are not non-rotatably connected with the clutch housing and thus with the respective annular space (piston chamber) and the corresponding carrier of the outer plates. The relatively simple design notwithstanding, the proposed reversing gear makes it possible to obtain a high shifting quality from the stated requirements. The danger of plate wobble occurring is small.

Unlike the countershaft 21, where the gear belonging to the output gear set 31 is the loose pinion 22, the output gear of the output shaft 20 is the fixed pinion 24.

The substitute arrangement, so to speak, of the loose pinion 25 and of the fixed pinion 24 of the output shaft 20 is not disadvantageous, as would be thought at first, but is combined with the following advantages: with the relatively large diameter of the fixed pinion 24, the tipping torques resulting from the helical cut selected because of the small development of noise become great. In the selected fixed design, the supporting base for the fixed pinion 24 becomes large. Thereby said tipping torques can be very well reinforced. The connection of said fixed pinion 24 with the output flange of the output shaft can be designed constructionally simpler than would be the case with a loose pinion. For these reasons the clutches 23 and 26 are disposed crosswise as described.

Reference numerals

| | |
|---|---|
| 1 reversing gear | 24 fixed pinion |
| 2 torque converter | 25 loose pinion |
| 3 impeller | 26 clutch |
| 4 engine | 27 fixed pinion |
| 5 output shaft | 28 fixed pinion |
| 6 gear | 29 fixed pinion |
| 7 countershaft | 30 drive wheel chain |
| 8 gear | 31 output gear set |
| 9 connection | 32 roller bearing |
| 10 turbine wheel | 33 roller bearing |
| 11 input shaft | 34 gear housing |
| 12 fixed pinion | 35 lid |
| 13 loose pinion | 36 roller bearing |
| 14 loose pinion | 37 roller bearing |
| 15 countershaft | 38 clutch housing |
| 16 countershaft | 39 set of plates |
| 17 clutch | 40 piston |
| 18 clutch | 41 annular space |
| 19 reversing set | 42 duct |
| 20 output shaft | 43 spring |
| 21 countershaft | 44 O-ring |
| 22 loose pinion | 45 O-ring |
| 23 clutch | |

We claim:

1. A multi-ratio powershiftable reversing gear (1) having one input shaft (11), a plurality of countershafts (15, 16, 20 and 21), one reversing gear set (19), clutches (17, 18, 23 and 26) being mounted upon said countershafts (15, 16, 20 and 21), a plurality of loose pinions (13, 14, 22 and 25) which are each selectively non-rotatably connected with a respective one of said countershafts (15, 16, 20 and 21) by said clutches for selecting a gear and a drive direction, and one output gear set (31) with one fixed pinion (24) being mounted upon an output shaft (20);

wherein said reversing gear set (19) includes one pinion (12) non-rotatably fixed to said input shaft (11) and loose pinions (13, 14) rotatable supported on said respective countershafts (15, 16); a fixed pinion (27, 28 and 29) is mounted on each of said respective countershafts (15, 16 and 21) and one loose pinion (25) is rotatably mounted upon said output shaft (20) to form a drive wheel chain (30); and said output gear set is formed by said fixed pinion (24) of said output shaft (20) and a first loose pinion (22) supported on a first said respective countershaft (21).

2. A gear according to claim 1, wherein said first loose pinion (22) is non-rotatably connected with first said countershaft (21) by a first clutch (23) for a first gear.

3. A gear according to claim 1, wherein said loose pinion (25), rotatably mounted upon said output shaft (20), is non-rotatably connected with said output shaft (20) by a second clutch (26) for a second gear.

4. A gear according to claim 1, in which said gear further includes inner plates of a set of plates (39) for one of said clutches (17, 18, 23 and 25), wherein said inner plates are connected with one of said loose pinions (13, 14, 22 and 25) while outer plates of said set of plates (39) are supported by a clutch housing (38) which is a component part of one of said countershafts (15, 16, 20 and 21).

5. A gear according to claim 4, wherein each said loose pinion (13, 14, 22 and 25) is supported by two roller bearings on its respective countershaft (15, 16, 20 and 21), one said roller bearing (36) is encased and substantially centrally located relative to said set of plates (39) and other said roller bearing (37) is located substantially in a vertical plane defined by said respective loose pinion (13, 14, 22 or 25).

6. A gear according to claim 5, wherein, for actuating at least one of said clutches (17, 18, 23 and 25), a piston (40) is movably supported in an annular space (41) of the clutch housing (38), which is a component part of the respective countershaft (15, 16, 20 and 21), and said piston (40) is snugly passed via seals (4, 45) into said annular space (41).

7. A gear according to claim 1, wherein said fixed pinion (24), situated upon said output shaft (20), is a helically cut gear.

8. A gear according to claim 1, wherein said loose pinions (13, 14, 22 and 25) do not rotate under load at a relative speed regarding their respective countershafts (15, 16, 21 and 20).

9. A gear according to claim 1, wherein said loose pinions (13, 14, 22 and 25) are driven via meshing teeth.

10. A gear according to claim 1, wherein each of said clutches (17, 18, 23 and 26) is located between a respective said loose and fixed pinion (13 and 27, 14 and 28, 22 and 29, 24, 25) and is in a common vertical plane bisecting a longitudinal cross section through said gear.

* * * * *